Aug. 7, 1962　　M. UMANOFF　　3,048,420
THREE-WHEELED SHOPPING CART
Filed Aug. 12, 1960
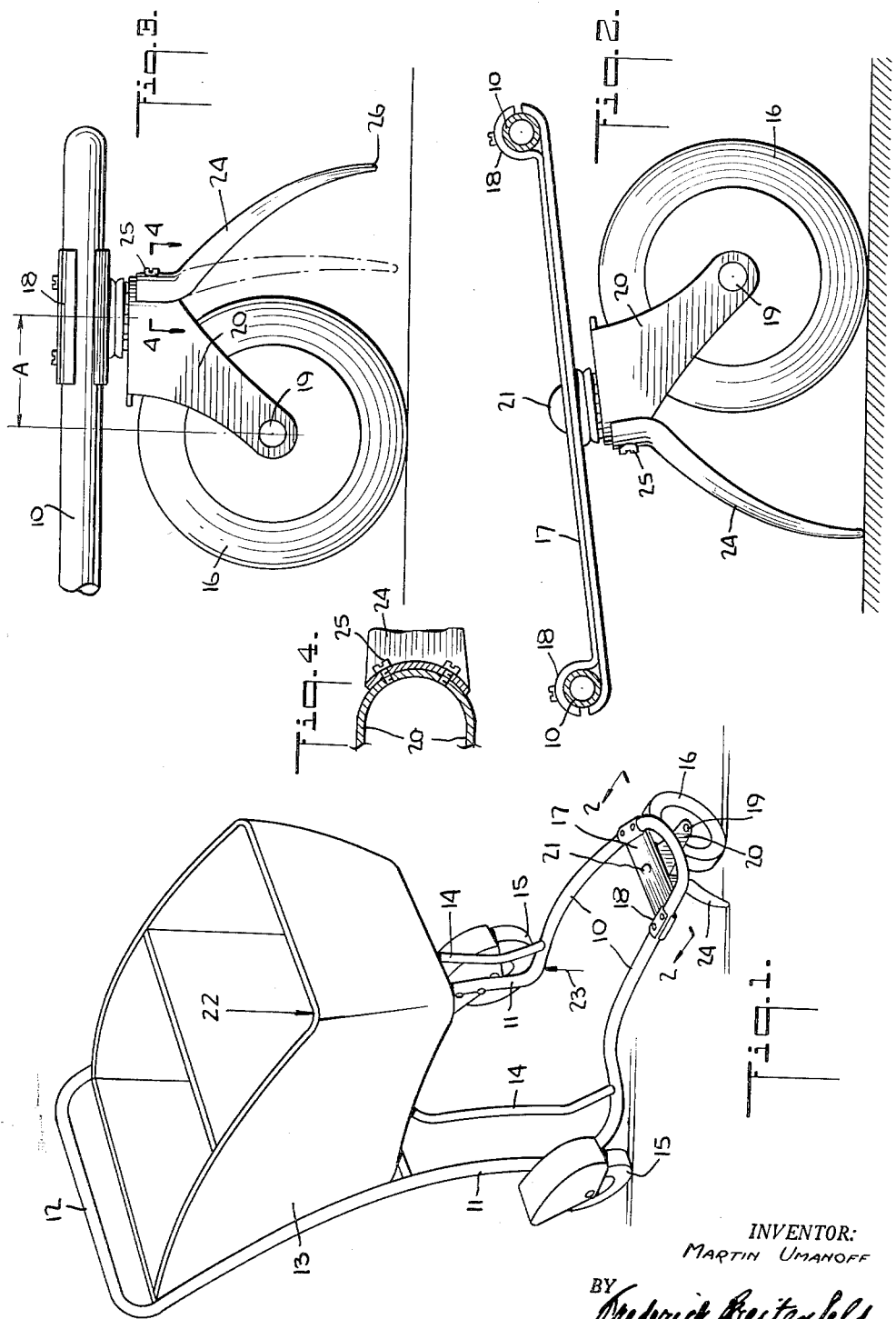
INVENTOR:
MARTIN UMANOFF
BY Frederick Breitenfeld
ATTORNEY 3,048,420
THREE-WHEELED SHOPPING CART
Martin Umanoff, Huntington, N.Y., assignor to R. A. MacPlum Industries, Inc., New York, N.Y., a corporation of New York
Filed Aug. 12, 1960, Ser. No. 49,322
5 Claims. (Cl. 280—62)

This invention relates generally to three-wheeled vehicles, and has particular reference to shopping carts.

In a three-wheeled cart having a pair of wheels at one end and a swiveled wheel at the other, the stability of the cart is impaired whenever the swiveled wheel turns sideward. The danger of cart upset is particularly great in the case of a shopping cart in which the wheels are carried by a frame adjacent to the floor and converging in the direction of the swiveled wheel. It is a general object of the invention to stabilize a vehicle of this type. More specifically, it is an object of the invention to provide a swiveled wheel assembly of improved structural nature, including a specially designed prop to minimize the danger of upset.

The invention is primarily intended for use on a shopping cart of the type which is nestable with others, and which includes a rear upright frame part terminating in a handle at its upper end, a forwardly tapered bin projecting forwardly from the upright part at an elevation from the floor, rear wheels supported at opposite sides of the cart beneath the handle, and a swiveled front wheel assembly carried by a lower wheel-carrying frame at its narrower front end. It will be understood, however, that certain features of the invention are not necessarily restricted in their applicability to vehicles of this specific nature.

A characterizing feature of the improved wheel assembly lies in the employment of an inverted U yoke supported for rotation on a vertical axis, a wheel axially supported between the free ends of the yoke along an axis laterally offset from the yoke axis, and a rigid prop element carried by the yoke and extending downwardly in a direction laterally offset in an opposite direction. The prop element has a lower end which is normally above the floor level, but which comes into contact with the floor under conditions in which the wheel has turned sideward and the cart has started to tip.

A particular feature of the invention resides in the design of the prop element with a concavo-convex horizontal cross-section, and with an arcuate curvature in a longitudinal direction, the convex side facing away from the wheel. This has numerous structural advantages, as will be pointed out hereinafter.

A basic objective is to provide a safety prop of the general type referred to, of inexpensive yet reliable character, and of a thoroughly practical nature adapted to be manufactured at low cost.

One way of achieving these general objects and advantages, and such other objectives as may hereinafter appear and be pointed out, is illustrated in the accompanying drawings, in which—

FIG. 1 is a perspective view of a three-wheeled cart embodying the features of this invention, the cart being shown in a position in which an upset is being prevented by the improved wheel assembly;

FIG. 2 is an enlarged view substantially along the line 2—2 of FIG. 1;

FIG. 3 is a side elevational view of the swiveled wheel assembly in the normal position assumed during movement of the cart in a forward direction; and FIG. 4 is an enlarged cross-sectional view along the line 4—4 of FIG. 3.

The cart chosen for illustration has a tubular metallic frame structure which includes lower rails 10 converging toward the front of the vehicle, and rear upright rails 11 joined at the top by a horizontal rail 12 defining the handle. Projecting forwardly from the rear part of the frame, at an elevation from the floor, is a forwardly tapering bin 13. To facilitate the support of this bin, auxiliary upright frame elements 14 may extend upwardly from the rails 10, to define a supporting structure beneath the bin.

Secured to the cart at the rear, preferably attached to the lower ends of the upright elements 11, are a pair of spaced rear wheels 15. At the front of the cart is a centrally disposed wheel 16 forming part of the improved swiveled wheel assembly. This assembly is supported at the narrower end of the lower frame, and a convenient way of accomplishing this is to provide a transverse plate 17 which extends between the forward ends of the rails 10 and is rigidly clamped to them as indicated at 18. The swiveled wheel assembly is supported on this plate, at the center thereof.

The wheel 16 is mounted on an axle 19 which is journaled between the lower free ends of the two arms 20 of a U-shaped yoke whose central part is pivoted at 21 to the plate 17 for rotation on a vertical axis. Roller bearings may be provided, if desired, to facilitate the free rotational movements of the yoke. The arms 20 are so shaped that the horizontal axis of rotation of the wheel 16 is laterally offset from the vertical axis of rotation of the yoke. This lateral offset is indicated at A in FIG. 3. This is a common arrangement which facilitates the swiveling of the wheel as the cart is maneuvered. For example, when the cart is being advanced in a forward direction (toward the right as viewed in FIGURE 3) the yoke normally swivels into the disposition shown, whereby the axis of rotation of the wheel 16 is slightly behind the vertical axis of rotation of the yoke.

During maneuverings of the cart, the wheel 16 frequently turns sideward, as indicated in FIGURES 1 and 2. Under these circumstances the cart is susceptible to tipping, especially if a youngster playfully stands upon one of the rails 10. A tipping of this nature is indicated in FIGURES 1 and 2, the tipping forces being represented by the arrows 22 and 23. To minimize the extent of tipping, and to prevent complete upset, the yoke which supports the wheel 16 is provided with the arcuate prop element 24. This element is secured at 25 to the upper part of the yoke, and it extends downwardly in a laterally offset direction opposite from the offset indicated at A.

The prop 24 is curved, in horizontal cross-section, as best indicated in FIGURE 4. The convex side of this curvature faces away from the wheel 16. It will be noted that the prop 24 is also curved longitudinally, and that the convex side faces away from the wheel 16. Whenever the cart tends to tip, the free end 26 of the prop 24, normally in an inoperative position above the floor level, contacts the floor as indicated in FIGURES 1 and 2, and thus prevents further tipping. As soon as the forces inducing the upset are discontinued, the cart resumes its normal upright disposition.

One of the reasons for the concavo-convex cross-section of the prop 24 is to rigidify it. Thus, with the cart moving in a forward direction, as indicated in FIGURE 3, the prop 24 serves as a convenient and effective buffer, in the event that it encounters an unexpected obstruction, such as a curbing. If the encounter is forceful enough, the element 24 may be deformed into the position shown in dash lines in FIGURE 3, but its basic nature as a tilt-preventing prop remains unimpaired.

It will be understood that in many respects the details herein described and illustrated may be modified by those skilled in the art without necessarily departing from the spirit and scope of the invention as expressed in the appended claims.

What is claimed is:

1. In a three-wheeled shopping cart, a wheel-supporting frame which narrows toward one end thereof, and a swiveled wheel assembly carried by the narrower end, said wheel assembly comprising a yoke pivoted to said frame on a vertical axis and having downwardly extending arms, a wheel whose axle is supported by the free ends of said arms, said arms being so shaped that the wheel axis is laterally offset from the yoke axis, and a prop carried by said yoke and extending downwardly in an oppositely offset direction, said prop having a lower end normally above the floor level and spaced from the yoke axis a distance at least as great as the spacing of the wheel axis from the yoke axis.

2. In a cart, a wheel assembly as defined in claim 1, said prop having a concavo-convex horizontal cross-section, the convex side facing away from the wheel.

3. In a cart, a wheel assembly as defined in claim 2, said prop being arcuate in a longitudinal direction, the convex side facing away from the wheel.

4. In a three-wheeled shopping cart of the type which is nestable with others, a rear upright frame part terminating in a handle at its upper end, a forwardly tapered bin projecting forwardly from said upright part at an elevation from the floor, a lower wheel-carrying frame converging toward the front, rear wheels supported by the frame at opposite sides of the cart, and a swiveled front wheel assembly carried by the frame at its narrower front end, said wheel assembly comprising an inverted-U yoke pivoted at its center to said frame for rotation on a vertical axis, a wheel axially supported between the free ends of said yoke, said yoke being of such shape that the wheel axis is laterally offset from the yoke axis whereby the tendency of the cart to tip is increased when the wheel turns sideward, and a prop for preventing cart upset under such conditions, comprising a rigid element carried by the upper part of the yoke and extending downwardly in a direction laterally offset in a direction opposite to that of said wheel axis, said prop element having a lower end normally in inoperative position above the floor level, said lower end being spaced from the yoke axis a distance at least as great as the spacing of the wheel axis from the yoke axis.

5. In a three-wheeled shopping cart, a wheel-supporting frame which narrows toward one end thereof, and a swiveled wheel assembly carried by the narrower end, said wheel assembly comprising a yoke pivoted to said frame on a vertical axis and having downwardly extending arms, a wheel whose axle is supported by the free ends of said arms, said arms being so shaped that the wheel axis is laterally offset from the yoke axis, and a prop carried by said yoke and extending downwardly in an oppositely offset direction, said prop having a lower end normally above the floor level, the distance between the lower end of said prop and the floor level being relatively small with respect to the distance of said lower end from the yoke axis.

References Cited in the file of this patent

UNITED STATES PATENTS

| 2,862,223 | Meyerhoefer | Dec. 2, 1958 |
| 2,901,262 | Berlin | Aug. 25, 1959 |

FOREIGN PATENTS

| 661,981 | Great Britain | Nov. 28, 1951 |